United States Patent

[11] 3,597,613

| [72] | Inventor | Venkatesan Rajagopal<br>Monroeville, Pa. |
|---|---|---|
| [21] | Appl. No. | 851,174 |
| [22] | Filed | Aug. 19, 1969 |
| [45] | Patented | Aug. 3, 1971 |
| [73] | Assignee | The United States of America as represented by the United States Atomic Energy Commission |

[54] METHOD OF MEASURING BORON CONCENTRATION IN WATER BY NEUTRON ABSORPTION
4 Claims, 2 Drawing Figs.

[52] U.S. Cl. ............................................. 250/83.1,
176/19 R, 250/43.5 D, 250/83.3 D
[51] Int. Cl. ............................................. G01t 3/00
[50] Field of Search ...................................... 250/83.1,
43.5 D, 83.3 D, 83 C; 176/19

[56] References Cited
UNITED STATES PATENTS

| 3,497,693 | 2/1970 | Duftschmid et al. | 250/83.3 D |
|---|---|---|---|
| 3,508,047 | 4/1970 | Mott et al. | 250/83.1 X |

OTHER REFERENCES

Hewlett-Packard; Electronic Test Inst.; Cat. #24, 1963; P. 120— 123, 132, & 133

*Primary Examiner*—James W. Lawrence
*Assistant Examiner*—Morton J. Frome
*Attorney*—Roland A. Anderson ABSTRACT: A method and apparatus for determining boron concentration in water. The principle of neutron absorption is used with an electronic arrangement for determining the time required to count a predetermined number of nonabsorbed neutrons. The time to reach the same number of counts with no boron present is subtracted. The remaining time is found to vary directly and linearly with boron concentration.

METHOD OF MEASURING BORON CONCENTRATION IN WATER BY NEUTRON ABSORPTION

BACKGROUND OF THE INVENTION

This invention was made in the course of, or under, a contract with the United States Atomic Energy Commission.

This invention relates to the determination of boron content in water. In operating nuclear reactors of the pressurized-water type (PWR), boric acid is extensively used for reactivity control. Accordingly, an on-line boron meter is very valuable device for insuring that the operator has complete knowledge of boron concentration in the reactor water at all times.

In the past, neutron absorption methods of analysis have taken the approach of determining the number of counts per unit time from detected neutrons. Thus, the higher the count, the lower the concentration of absorbing material. This inverse relationship required the operator to compare the count with previously determined graphs or tables. Furthermore, the inverse relationship was frequently not linear but a more complex function of concentration. As a result, the determination of boron concentration was time consuming, inaccurate and did not permit the continuous monitoring and automatic control desirable for a nuclear reactor.

SUMMARY OF THE INVENTION

It is accordingly an object of my invention to provide an accurate method and apparatus for determining the concentration of boron in water, using neutron absorption.

It is another object of my invention to provide a method and apparatus having a parameter linearly and directly proportional to boron concentration, thereby allowing direct readout of boron concentration or automatic activation of control equipment.

It is still another object of my invention to provide apparatus for the aforesaid purposes which can be calibrated without taking the measuring system out of operation.

Other objects and advantages of my invention will be apparent to those skilled in the art from the following detailed description.

In my invention a beam of thermalized neutrons is directed at water containing boron. Some of the neutrons are captured by the boron. Those not captured are detected; the more boron, the more captures and the longer it will take for a given number of counts to be registered in the meter. When the time to register the given number of counts with zero boron concentration is subtracted, the resulting differential time has been found to be linearly proportional to boron concentration, throughout a significant range of concentrations.

DETAILED DESCRIPTION

Figure 1:
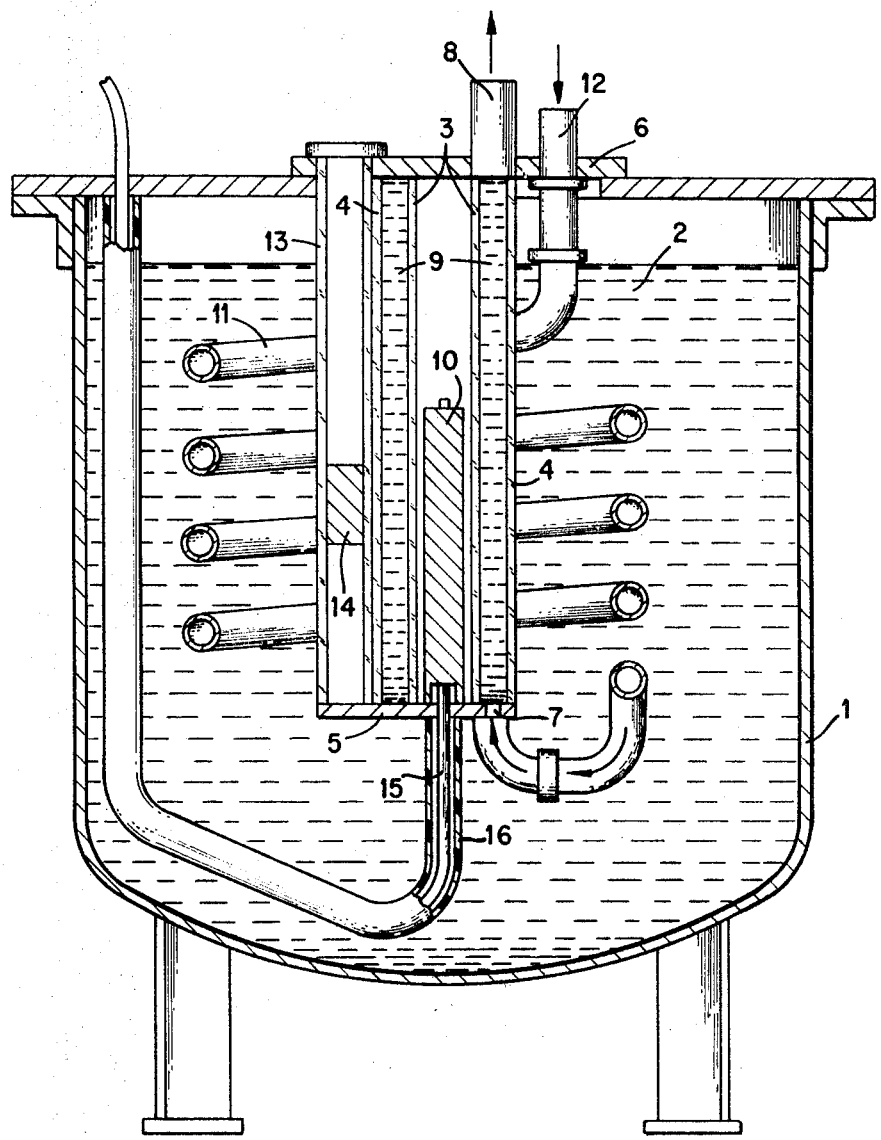
FIG. 1 shows in partial cross section the essential components of the system of my invention, through the detection stage.

The preferred embodiment of the apparatus used for carrying out the process of may invention is shown in FIG. 1. A tank 1 contains water 2, which is to act as a radiation shield and as a constant temperature bath. An immersion heater (not shown) is used to keep the water at the desired temperature.

A pair of concentric tubes 3 and 4 are mounted on a support member 5 and are held at the top by a plate 6. The tubes 3 and 4 are made of clear plastic, such as lucite, and are closed at both ends except for an inlet 7 and an outlet 8. The space between the tubes 3 and 4 thus forms an annulus 9 having a width equal to the difference in radius of tubes 3 and 4. The annulus 9 should preferably be about 0.875 inch wide, but good results can be obtained with an annulus width as small as 0.6 inch. The smaller tube 3 must have an internal diameter large enough to accommodate the detector 10, later to be described.

A coiled heat exchanger tube 11 is provided to conduct the boronated water sample from the supply inlet 12 to the annulus inlet 7. As the sample moves through coil 11 it assumes the constant controlled temperature of the tank water 2.

A third tube 13, also made of a clear plastic such as lucite, holds a neutron source 14. The holding tube 13 is mounted adjacent the outer wall of annulus 9 which is formed by tube 4.

The neutron source 14 is a 10-Curie mixture of plutonium and beryllium. Such a source produces about $2.2 \times 10^7$ neutrons/sec. For adequate radiation protection the tank geometry and water height should be such that the source 14 is surrounded by at least 15 inches of water in any direction. Plastic moderators (not shown) may be placed in the tube 13 above and below the source 14 in order to prevent fast neutron leakage.

The neutron detector 10 is a $B^{10}$ lined proportional counter, for example Westinghouse Model 22792.

Figure 2:
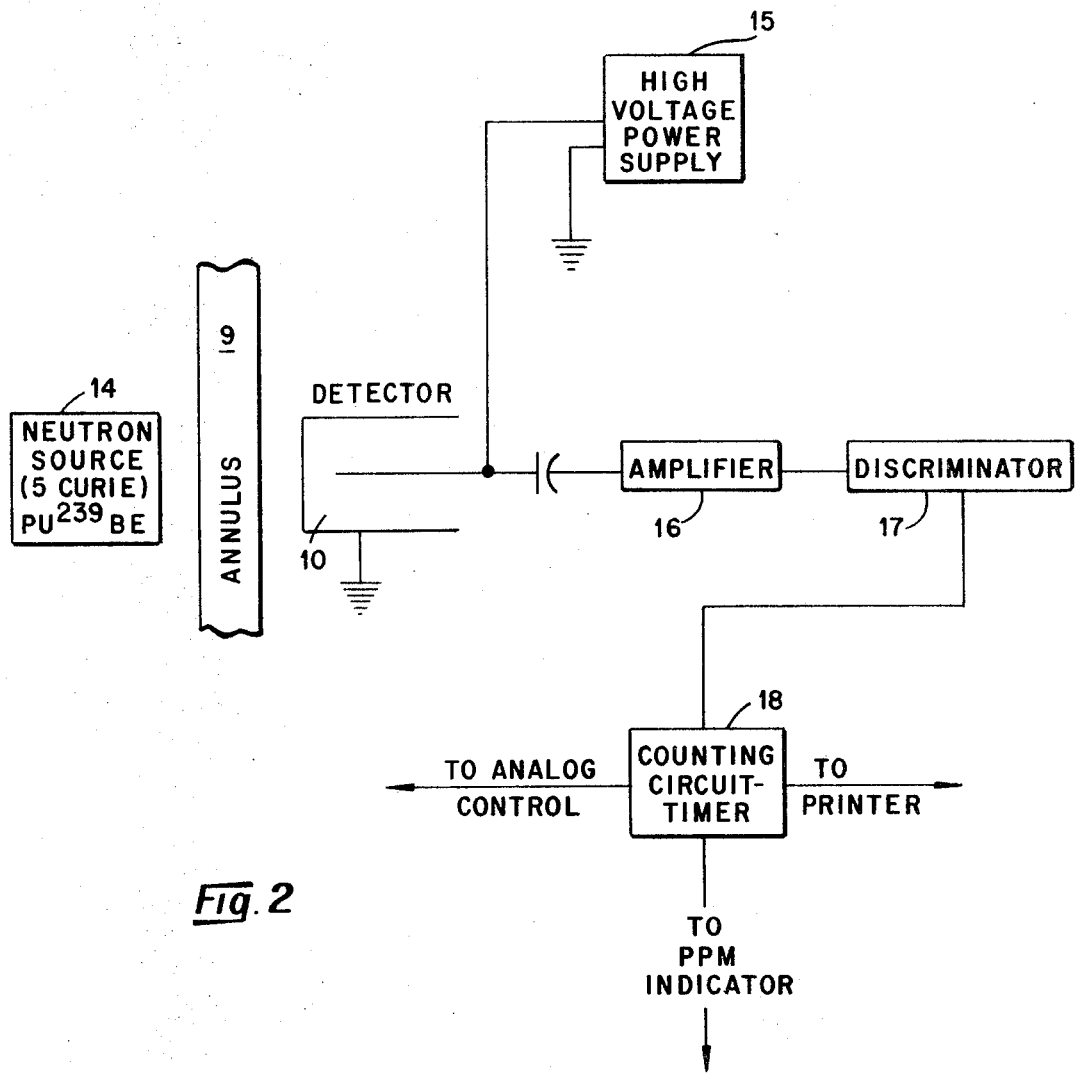
FIG. 2 is a block diagram of the full system of my invention.

A plastic tube 16 is provided to carry a cable 15 from the detector 10 to the high voltage power supply shown in FIG. 2.

The operation of the portion of my apparatus shown in FIG. 1 is as follows: The boronated sample water flows through the heat exchanger 11 into the annulus 9. The neutron source 14 emits neutrons which enter the annulus and the boronated water contained therein. Some of the neutrons are captured by the boron, while others pass through the annulus and are detected by the detector 10. I have discovered that with the arrangement herein described, the relationship between boron concentration in the annulus 9 and the number of neutrons detected by the detector 10 is essentially linear in the range of 0—5,000 parts per million of boron. Since this linear relationship is an inverse proportion, i.e., the more boron the fewer counts, a method of converting the count to a directly proportional parameter is desirable if direct readout is to be possible.

An arrangement of components for accomplishing the conversion to a direct proportion is shown in block diagram form in FIG. 2. The arrangement utilizes a novel approach in radiation counting. Instead of measuring counts per unit time, I measure the amount of time required for a predetermined number of counts to be registered.

Referring to FIG. 2, the source 14, annulus 9 and detector 10 have been discussed in the preceding section. The detector 10 is energized by a high voltage power supply 15. The neutron counts of the detector 10 appear as pulses which are amplified by amplifier 16, fed through a pulse height discriminator 17 to a counting and timing means 18 which is essentially a scaler-timer circuit well known in the art. The components 15 through 18 may be selected from commercially available items. For example, the high voltage power supply 15 may be the John Fluke Model 408A; the amplifier 16 may be the Kiethley Model 104; the discriminator 17 may be the RIDL Model 30—16; and the counting and timing means 18 may be Hamner models N-810 and N-288 respectively.

In the counting and timing means 18, the amplified, discriminated pulses from the detector 10 are counted. Simultaneously with the beginning of neutron detection, a predetermined time begins to elapse, at the end of which the timer is activated. The predetermined time is the time required for a fixed number of counts, e.g., 1,000,000 to be registered with pure water in the annulus 9. This predetermined time is therefore the equivalent of zero concentration of boron in the annulus 9. After the predetermined time has elapsed with a boronated sample in the annulus, any further time required to reach the same fixed number of counts (1,000,000 in this example) is attributable to absorption of neutrons by the boron in the annulus 9. The more boron in the annulus 9 the longer it will take for the fixed number of counts to be registered in the counting circuit of the counting-timing means 18. The relationship between boron concentration and time to reach the fixed number of counts is therefore linear and direct. The timer is thus activated, producing an output signal, when the predetermined time has elapsed, and deactivated, terminating the output signal, when the fixed number of counts has been reached.

It will be apparent to those skilled in the art that the timing signal can be fed to a calibrating circuit to present a nixie-tube readout directly in parts per million of boron. The signal can also be used to mark a calibrated strip chart. Still another use for the signal is to feed it to automatic control equipment whereby the boron content in the water of a nuclear reactor can be automatically maintained at a desired level.

Many alternative selections and modifications to the electronics components are of course possible within the scope of my invention. Those described above are illustrative of the inventive concept.

It should be noted that the absorption meter described herein lends itself to calibration while on line. This may be necessary from time to time because of drift in the electronic components. Such calibration may be accomplished by slipping a metallic shim or sleeve down over the detector 10, the sleeve having a known laboratory-determined boron equivalance, e.g., 100 p.p.m. If functioning properly, the meter reading should increase by this amount when the sleeve is placed over the detector.

I claim:

1. A method of producing an electrical signal the duration of which is linearly proportional to the concentration of boron in water, comprising the steps of:
   a. passing water containing boron into an annulus;
   b. bombarding the water with neutrons, whereby a first portion of the neutrons are captured in the boron and a second portion of the neutrons pass through the boron-containing water and out of the annulus;
   c. detecting said second portion of neutrons;
   d. counting the pulses from the detector;
   e. determining an initial time period corresponding to the detection of a fixed number of counts with only water in the annulus, which is the equivalent of zero concentration of boron;
   f. generating a timing signal after said initial period;
   g. stopping the timing signal when the same fixed number of counts have been detected in the boron-containing water;
   h. recording the time required to achieve said fixed number of counts; and
   i. producing a timer output signal which may be fed to a calibrating circuit to present a readout directly in concentration of boron.

2. The method of claim 1, further comprising the step of visually displaying the duration of said timing signal in terms of boron concentration.

3. The method of claim 1 wherein the annulus has a width between 0.600 and 0.875 inch.

4. The method of claim 3 wherein the bombarding neutrons are obtained from a 10-Curie plutonium-beryllium source mounted adjacent the annulus.